(12) United States Patent
Hampe et al.

(10) Patent No.: US 11,795,001 B2
(45) Date of Patent: Oct. 24, 2023

(54) ANALOG-CONTROLLED TRANSPORT DEVICE WITH DATA READ-OUT

(71) Applicant: INTERROLL HOLDING AG, Sant' Antonino (CH)

(72) Inventors: Andreas Hampe, Moenchengladbach (DE); Herbert Henze, Moenchengladbach (DE)

(73) Assignee: INTERROLL HOLDING AG, Sant'antonino (CH)

( * ) Notice: Subject to any disclaimer, the term of this patent is extended or adjusted under 35 U.S.C. 154(b) by 403 days.

(21) Appl. No.: 17/254,300

(22) PCT Filed: Jun. 18, 2019

(86) PCT No.: PCT/EP2019/065971
§ 371 (c)(1),
(2) Date: Dec. 21, 2020

(87) PCT Pub. No.: WO2020/002043
PCT Pub. Date: Jan. 2, 2020

(65) Prior Publication Data
US 2021/0171286 A1      Jun. 10, 2021

(30) Foreign Application Priority Data
Jun. 29, 2018   (DE) .................... 10 2018 005 149.9

(51) Int. Cl.
*B65G 13/02*      (2006.01)
*B65G 43/00*      (2006.01)
*G05B 19/042*     (2006.01)

(52) U.S. Cl.
CPC ............. *B65G 13/02* (2013.01); *B65G 43/00* (2013.01); *G05B 19/0423* (2013.01); *B65G 2811/093* (2013.01); *G05B 2219/21085* (2013.01)

(58) Field of Classification Search
CPC ........ B65G 13/02; B65G 43/00; B65G 43/10; B65G 2811/093; G05B 19/0423; G05B 19/0426; G05B 2219/21085
See application file for complete search history.

(56) References Cited

U.S. PATENT DOCUMENTS

| 4,497,019 A | 1/1985 | Waber |
| 6,013,108 A | 1/2000 | Karolys et al. |

(Continued)

FOREIGN PATENT DOCUMENTS

| DE | 698 10 975 T2 | 8/2003 |
| DE | 10 2014 101 672 A1 | 8/2015 |

(Continued)

*Primary Examiner* — Gene O Crawford
*Assistant Examiner* — Keith R Campbell
(74) *Attorney, Agent, or Firm* — Norman B. Thot (57) ABSTRACT

A conveyor apparatus includes a drive unit, a connection interface which transmits analog signals, and a drive control module which is coupled to the drive unit and to the connection interface via signal technology. The drive control module receives analog control signals via the connection interface in an operating state and controls the drive unit as a function of the analog control signals, outputs digital diagnostic signals via the connection interface in a digital communication state, and switches from the operating state to the digital communication state upon receipt of a switchover command. The switchover command is made up of a predetermined analog control signal or a predetermined sequence of analog control signals.

20 Claims, 6 Drawing Sheets

(56) References Cited

U.S. PATENT DOCUMENTS

| | | | |
|---|---|---|---|
| 6,253,909 B1 | 7/2001 | Kalm et al. | |
| 7,360,638 B2 * | 4/2008 | Ko | H01R 27/00 |
| | | | 198/575 |
| 7,535,279 B2 | 5/2009 | Metzler | |
| 11,377,301 B2 * | 7/2022 | Hampe | B65G 43/00 |
| 2004/0182683 A1 | 9/2004 | Bigelow et al. | |
| 2008/0141271 A1 | 6/2008 | Gilboa et al. | |
| 2011/0137587 A1 | 6/2011 | Rothlisberger et al. | |
| 2015/0106394 A1 | 4/2015 | Otto et al. | |
| 2022/0106128 A1 * | 4/2022 | Cipriani | B65G 13/075 |

FOREIGN PATENT DOCUMENTS

| | | |
|---|---|---|
| EP | 1 590 275 B1 | 11/2006 |
| JP | H06-224825 A | 8/1994 |
| JP | 2003-260919 A | 9/2003 |
| JP | 2005-250883 A | 9/2005 |
| TW | 200910098 A | 3/2009 |
| WO | WO 2015/057492 A1 | 4/2015 |

* cited by examiner

ANALOG-CONTROLLED TRANSPORT DEVICE WITH DATA READ-OUT

CROSS REFERENCE TO PRIOR APPLICATIONS

This application is a U.S. National Phase application under 35 U.S.C. § 371 of International Application No. PCT/EP2019/065971, filed on Jun. 18, 2019 and which claims benefit to German Patent Application No. 10 2018 005 149.9, filed on Jun. 29, 2018. The International Application was published in German on Jan. 2, 2020 as WO 2020/002043 A1 and as WO 2020/002043 A9 under PCT Article 21(2).

FIELD

The present invention relates to a conveyor apparatus comprising a drive unit, a connection interface configured for analog signal transmission, and a drive control module which is connected to the drive unit and the connection interface via signal technology. A further aspect of the present invention is a diagnostic device for a conveyor apparatus having a motor-operated conveyor roller, comprising an electronic diagnostic unit having a control data interface. The present invention further relates to a method for outputting, and a method for reading out, configuration data from an analog-controlled conveyor apparatus. The present invention finally relates to a method for programming an analog-controlled conveyor apparatus.

BACKGROUND

Conveyor apparatuses of the kind initially specified are used in the intralogistics sector for various purposes in fully and partially automated logistics processes. They can, for example, be used for conveying conveyed items, for example, palettes, boxes, cases, mail, or the like. Such conveyor apparatuses can, for example, be implemented in a motor-operated conveyor roller or as a motor-operated conveyor roller.

In conveyor tracks of larger conveyance systems, conveyor rollers can, for example, be arranged in series in a conveyor framework and pivot-mounted therein in order to transport the conveyed items via the conveyor track. An upper circumferential surface of the conveyor rollers is used for the direct accommodation of the conveyed items. Conveyor rollers can also be used in belt and/or band conveyors, wherein a surface of the belt or band is used for accommodating the conveyed items. Non-driven, i.e., driveless or motor-operated conveyor rollers, i.e., conveyor rollers which are equipped with an electric drive unit, can generally be used. The motor-operated conveyor rollers can be coupled to one or several non-driven conveyor rollers, in particular by transmission elements, in order to cause them to rotate. Motor-operated conveyor rollers of this type are referred to, inter alia, as motorized rollers or roller drives. A motor-operated conveyor roller can also be a drum motor which is, for example, used for driving a conveyor band as a terminal deflection roller, or in another form, which drives a conveyor track having a conveyor band or a differently configured conveyor track. Conveyance systems often have a complex structure in which many infeeds and outfeeds, bifurcations, intersections, or the like occur, wherein the conveyance operations frequently run on one or more than one level. In order to ensure operation in such conveyance systems which is free of malfunctions and in which the conveyed objects are also not damaged, the conveyor apparatuses are often operated in the so-called zero-pressure accumulation (ZPA) mode, or in a low-pressure accumulation (LPA) mode. The conveyed items which are situated on the conveyor track should not come into contact with one another, or should come into contact with one another only with a low back pressure, so that damage to conveyed items does not occur due to additive contact force.

In order to actuate conveyance systems having such a design for individual tasks and tasks which vary from conveyed item to conveyed item, and in order to implement zero-pressure accumulation conveyance or low-pressure accumulation conveyance, conveyor tracks of the conveyance systems are typically divided into a plurality of conveyance zones. Each conveyance zone has several conveyor rollers which are arranged one behind the other, wherein at least one conveyor roller is motor-driven. The motor-operated conveyor roller can, for example, be coupled to adjacent rollers which also run via drive belts, chains, or the like, and which can drive them in order to thereby define a uniformly actuated conveyance zone. Several such conveyance zones can then be arranged in succession in the conveyor track in order to convey the conveyed items along the conveyor track. The division into several conveyance zones alone cannot, however, ensure zero-pressure accumulation operation of the conveyance systems. Conveyance zones additionally often have a sensor which can detect the presence of conveyed items in the conveyance zone. As a result, the conveyed items can be conveyed on a conveyor track, for example, in zero-pressure single take-off or in block take-off.

Previously known conveyance systems are described in EP 1 590 275 B1 and U.S. Pat. No. 6,253,909 B1. These conveyance systems comprise a system made up of a plurality of conveyance zones which are respectively controlled by control units. The control units of the conveyance zones can exchange data with one another in order to implement the individual actuation operations for each conveyance zone in conveyance zones which are situated upstream and/or downstream as a function of the conveyance situation.

It is necessary for the characteristics and programmed attributes of motorized rollers within the conveyance system to be matched to one another in order to meet the requirements of advanced control technology. A characteristic of a conveyor roller may be understood to be, for example, a gear ratio of a gearbox which is configured therein, an acceleration and braking behavior of the drive, or any other invariable geometric, electrical, or mechanical characteristics. In the case of the failure and replacement of a conveyor roller or in the case of a reconfiguration of the conveyance system, the required matching makes it necessary to reconfigure the replacement conveyor roller or all conveyor rollers of the conveyance system, or to select and arrange them based on their configuration. This takes considerable time and thus results in undesirable downtime of the conveyance system.

Since a failure of a conveyor roller entails downtime and financial damage which extend far beyond the purely financial investment in the replacement of the component causing the failure, it is furthermore desirable to reduce the period for replacement due to wear.

It is known to control and program conveyor rollers via data bus technology, via a data bus line, using digital control data. Such data bus technology is generally understood to be a type of data communication in which several peripheral devices are connected to a shared data line, and the individual actuation of a single one of the plurality of control units takes place by assigning bus addresses, which are prepended as an address block to each control command contained in a data packet for an individual control unit within the data packet, in order to address the desired individual control unit via the address block and to transmit the corresponding command within the data block thereto. This generally makes it possible to reprogram such conveyor rollers more rapidly. This approach cannot, however, be used in conventional conveyor apparatuses in which the conveyor rollers are controlled by analog control signals via a single-wire or multiwire analog control line. Exact matching of the control signals must here be carried out regularly, having knowledge of the characteristics of the conveyor roller, which thus necessarily takes time.

SUMMARY

An aspect of the present invention is to provide an option for reducing the maintenance effort and the downtime in the case of the failure of a conveyor apparatus in a conveyor system, in which conveyor apparatuses which are actuated by analog means are used additionally or exclusively.

In an embodiment, the present invention provides a conveyor apparatus which includes a drive unit, a connection interface which is configured for analog signal transmission, and a drive control module which is coupled to the drive unit and to the connection interface via signal technology. The drive control module is configured to receive analog control signals via the connection interface in an operating state and to control the drive unit as a function of the analog control signals, to output digital diagnostic signals via the connection interface in a digital communication state, and to switch from the operating state to the digital communication state upon receipt of a switchover command. The switchover command is made up of a predetermined analog control signal or a predetermined sequence of analog control signals.

BRIEF DESCRIPTION OF THE DRAWINGS

The present invention is described in greater detail below on the basis of embodiments and of the drawings in which.

DETAILED DESCRIPTION

The present invention provides a means of a conveyor apparatus of the kind initially specified in which the drive control module is configured to receive analog control signals via the connection interface in an analog operating state and to control the drive unit as a function of these control signals, to output digital diagnostic signals via the connection interface in a digital communication state, and to switch from the operating state to the digital communication state upon receipt of a switchover command, wherein the switchover command is made up of a predetermined analog control signal or a predetermined sequence of analog control signals.

The present invention is based on the following findings:

An enormous cabling effort would be necessary to be able to query an actual state in larger conveyance systems. Conventional control units are additionally not usually configured to query or process data. Due to the complexity of conveyance systems and the, for example, fully or partially automated operation, it is usually not possible, or not possible in a timely manner, for operating personnel, a camera system, or the like to be able to detect abnormalities or a fault.

In order to reduce this cabling effort, it is known to equip motor-operated conveyor rollers with bus lines in order to be connected via signal technology to a drive unit, via a bus interface arranged in the conveyor roller tube. As a result, it is then possible to monitor numerous actual states of the motorized roller and to transmit setpoint states to the motorized roller, and to avoid equipping with numerous single-wire analog data bus lines.

Equipping with bus lines is, however, disadvantageous in that existing conveyance systems must be laboriously retrofitted, and/or the conveyor apparatuses or motor-operated conveyor rollers having a conveyor apparatus must be completely exchanged, which is time-consuming and costly. It is additionally often not possible to equip drive units having standard interfaces with a bus connection. It is also often disadvantageous that drive units are installed, for example, in conveyor rollers, and are difficult to access. The advantages of this approach accordingly usually predominate only in the case of conveyance systems which are in the planning stage.

For this reason it is in particular worthwhile to compare an actual state with a setpoint state on a regular or continuous basis. It is often desirable to read out and evaluate data, for example, from the drive unit for diagnostic purposes or in order to perform reprogramming.

According to the present invention, the drive control module is configured to receive analog control data in an operating state, which are used for controlling the drive of the motorized roller, and to supply the data to the drive unit, so that the motion of the conveyor apparatus is analog-controlled. Upon receipt of a predetermined analog control signal or a predetermined sequence of analog control signals via the connection interface, the motor electronics are furthermore configured to interpret or decode this as a switchover command, and to switch to a digital communication state after receiving such a switchover command. In this digital communication state, the conveyor apparatus can transmit or receive configuration data via the connection interface. This configuration data can comprise, for example, a sequence of digital data information, i.e., a sequence of binary-encoded data information.

These configuration data can contain permanent, i.e., invariable information about the conveyor apparatus, which are transmitted outside the conveyor apparatus and which describe one (or several) characteristic(s) of the conveyor apparatus, for example, a serial number, a manufacturing date, gearbox ratio, a gearbox type, a motor design, or a geometric characteristic of the conveyor apparatus. The configuration data in this case are used to make the characteristics of the conveyor apparatus quickly identifiable to a user or another electronic unit, in order to thereby reduce the time required for replacing the conveyor apparatus or adjusting other components based on these characteristics.

The configuration data can furthermore contain non-permanent, i.e., variable information about the conveyor apparatus, which is transmitted outside the conveyor apparatus and which describes one or several pieces of operating data information about the conveyor apparatus, for example, a number of operating hours, a number of start-ups, a maximum operating temperature, a number of rotations of a drive unit, and/or programming data and/or query data, a peak load, or a number of summed rotations since the conveyor apparatus was put into operation. The configuration data in this case are used to make the ongoing operating state of the conveyance apparatus quickly identifiable to a user or another electronic unit, in order to plan a replacement, maintenance, or a control adjustment, as necessary.

It has been recognized that, for the purpose of a reliable operation of an entire conveyance system, it is advantageous to be able to quickly read out certain data of a conveyor roller or the drive unit and/or control unit and/or a conveyance zone and/or an entire conveyor track, in order to detect or predict faults or malfunctions early and to thus be able to prevent them.

The present invention provides the possibility to monitor an actual state. The conveyor apparatus according to the present invention is configured for exchanging the configuration data, and for this purpose, uses existing inputs and/or outputs of the drive unit or its control unit, i.e., existing single-wire or multiwire electrical lines which are used during operation for transmitting analog control data.

In order to enable such a transmission of the configuration data, the drive control module connected to the drive unit via signal technology can be configured to enable data transmission with a diagnostic device which is spaced apart from the conveyor apparatus and which is connected via signal technology to said conveyor apparatus via an interface. The diagnostic device can, for example, be configured to transmit and/or receive digitally encoded configuration signals and to decode the received configuration signals, in order to thereby obtain diagnostic information. The drive control module additionally enables the receipt of the switchover command, for example, by detecting a predetermined analog control signal or a predetermined sequence of analog control signals. The drive control module can furthermore initiate the switchover of the operating state to the digital communication state as a function of the switchover command, and the switching back from the digital communication state to the operating state as a function of the receipt of a digital or analog switchback command.

Analog control signals are transmitted to the drive unit in the operating state according to the present invention. The analog control signals are, for example, infinitely variable voltage signals from a certain voltage range, for example, 0 to 5 V, which constitute a control signal for a velocity of the drive unit. In the operating state, analog fault signals of the drive unit can also be transmitted by the control module, as necessary. The digital communication state constitutes a second type of operation of the conveyor apparatus. No analog control signals can, for example, be transmitted to the drive unit. Configuration data can, for example, instead be transmitted for diagnostic purposes or for programming.

A conveyor apparatus can generally be connected via signal technology to a control unit which is arranged outside the roller body and to which the configuration data are transmitted. The control unit comprises a diagnostic device in this case. The conveyor apparatus can in this case be permanently connected to the control apparatus. In another embodiment, the diagnostic device can be provided as a separate electronic component which is connected to the conveyor apparatus instead of, or in addition to, a control unit. In this case, the connection is generally established only for the purposes of, and for the duration of, the reading out of diagnostic data of the conveyor apparatus.

The drive unit provided according to the present invention can, for example, be configured for torque generation and rotational motion between an axle element and a conveyor roller tube which is rotatably mounted around the axle element, and can be mechanically coupled to the axle element and the conveyor roller tube, wherein the drive unit can, for example, be arranged inside the conveyor roller tube. The electronic drive control module which is coupled to the drive unit via signal technology can, for example, also be arranged inside the conveyor roller tube.

According to the present invention, the drive control module is configured to receive analog control signals in the operating state and to thereby actuate the drive unit. The drive control module can, for example, receive these analog control signals from a control unit which is arranged outside the conveyor roller tube. For this purpose, the drive control module can, for example, be connected to the control unit via signal technology via an analog data line. The drive control module can further detect the switchover command and switch the type of operation between the analog communication state (the operating state) and the digital communication state. The drive control module can, for example, thus selectively receive and process analog control signals and transmit status signals in the analog type of operation, and can transmit digital configuration data or operating and diagnostic data in the digital type of operation.

An exchange and/or transmission of data, in particular of configuration data, may generally be understood to mean a transmission of signals, in particular analog control signals and/or digital diagnostic data, i.e., sending signals and/or receiving signals. The transmission can, for example, comprise signals first being received, and the signals then being forwarded.

The drive control module can, for example, be configured to prepare and form operating and diagnostic data and, for example, to transmit it to operating personnel or an external system control module or a communication box.

These data can be generated from the signals and signal profiles of different sensors and detectors.

These diagnostic data can, for example, constitute operating data and/or configuration data and/or sensor data of different sensors or detectors. The drive control module can, for example, be configured to process and/or prepare the received configuration data. Via the conveyor apparatus developed according to the present invention, an option is provided for enabling data transfer in analog-controlled, motor-operated conveyor rollers. The drive control module according to the present invention makes it possible to transmit data via the connections and data lines which already exist. It is thereby possible to monitor actual states of the motorized roller.

According to a first embodiment, the present invention provides that the drive control module can, for example, be configured to switch from the digital communication state to the operating state upon the receipt of a switchback command, wherein the switchback command is formed by a predetermined digital data signal.

In addition to the switchover command transmitted in analog form, the drive control module is also configured to receive a switchback command which is configured as a digital signal and which is transmitted in the digital communication mode. The return of the conveyor apparatus to the operating mode can therefore be triggered after the diagnosis of the conveyor apparatus is concluded.

The configuration data can, for example, be transmitted in the form of query data only following corresponding commands. The drive control module can, for example, be configured to receive query data, for example, in the digital communication state, and to transmit certain configuration data in response to these query data. The drive control module can, for example, be configured to receive different query data in order to transmit correspondingly different configuration data.

In an embodiment of the present invention, the drive control module can, for example, be configured to receive the switchover command as a single analog control signal having a predetermined analog value, and/or as a predetermined sequence of analog control signals having predetermined matching analog values or having predetermined analog values which are different from one another.

The single analog control signal can, for example, be a control signal, i.e., for example, a voltage signal, which is not used for controlling a motion of the conveyor apparatus in the operating mode, for example, a 5.2 V analog signal, which is outside the utilized analog control range of 0 to 5 V. Such analog control signals can, for example, be generated and/or invoked for activating the switchover operation.

A predetermined sequence of analog control signals can alternatively encode a switchover command, wherein this sequence is not used for controlling a motion of the conveyor apparatus in the operating mode. A sequence of direction-reversal signals which have been transmitted several times within a brief period can thus, for example, constitute an encoded switchover command. It is in particular to be understood that the switchover command can also be formed by a predetermined sequence of control signals which occur within a predetermined time span or which have a predetermined time interval with respect to one another.

Analog control signals can, for example, comprise such control signals, which are used in the operating mode for controlling a motion of the conveyor apparatus, individually and/or in a predetermined partial sequence. The entire analog control range can as a result be used in the operating mode, but the switchover command is encoded by a sequence which is atypical for the operating mode and which is previously determined. According to the present invention, it is generally to be understood that a previously determined sequence or a control signal is previously known to the transmitting unit and the receiving unit, i.e., it is typically stored, and is used for encoding or decoding the switchover command.

The connection interface can, for example, comprise a first control data contact terminal, and the drive control module can, for example, be configured to transmit a single analog control signal and/or a sequence of analog control signals via the first control data contact terminal, wherein the sequence of analog control signals can, for example, comprise at least one temporal sequence of a first voltage signal, a second voltage signal, and a third voltage signal. The first voltage signal and/or the second voltage signal and/or the third voltage signal can, for example, be different. The switchover command in this embodiment is transmitted via a single line, for example, as a sequence of control signals.

The drive control module can, for example, be configured to receive and/or transmit a sequence of configuration data in the digital communication state, via the first control data contact terminal. According to this embodiment, the first control data contact terminal is configured to receive analog control signals in the operating state, and to transmit configuration data for diagnostic purposes in the digital communication state.

In an embodiment variant of the present invention, it can, for example, be provided that the connection interface comprises a first control data contact terminal and a second control data contact terminal, and that the drive control module is configured to receive the switchover command as a first predetermined analog control signal at the first control data contact terminal, and as a second predetermined analog control signal at the second control data contact terminal. Via this embodiment, in the operating state, the connection interface can receive a first analog control signal and transmit a second analog control signal, for example, an error signal, for example, simultaneously. Corresponding thereto, in the digital communication state, the connection interface can receive a first communication signal and receive a second communication signal, for example, simultaneously and/or at a predetermined time interval. A first analog control signal and a second analog control signal, or a first communication signal and a second communication signal, can also in particular be transmitted and/or transferred, for example, simultaneously and/or at a predetermined time interval.

The drive control module can, for example, be configured to receive the first and the second control signal synchronously, to receive the first and the second control signal having a time shift, to receive the first and the second control signal as a respectively single analog control signal, or to receive the first and the second control signal respectively as a temporal sequence of analog control signals.

The drive control module can, for example, be further configured to transmit or receive configuration data in the digital communication mode, via the first control data contact terminal and the second control data contact terminal. In the digital communication state, the drive control module can, for example, be configured to receive a sequence of configuration data via the first control data contact terminal and/or to transmit a sequence of configuration data via the second control data contact terminal. The transmission and reception can, for example, take place in particular simultaneously and or in a temporal sequence.

Configuration data which are transmitted by the drive control module are in particular used for diagnostic purposes. Configuration data which are received by the drive control module can, for example, form query data which, for example, initiate the transmission of certain configuration data from the drive control module to an external diagnostic device.

The drive control module can, for example, be configured to receive query data in a first step, wherein these query data can, for example, be received in the form of digital data and query particular configuration data.

A further aspect of the present invention is a diagnostic device for a conveyor apparatus having a motor-operated conveyor roller, comprising an electronic diagnostic unit having a control data interface, in which the electronic diagnostic unit is configured to output an analog switchover command to the control data interface, wherein the analog switchover command is output via the control data interface as a predetermined analog control signal or as a predetermined sequence of analog control signals, and after outputting the analog switchover command, to receive a diagnostic data record via the control data interface in a digital communication state, and to receive the diagnostic data record as a sequence of digital, binary-encoded diagnostic data.

This diagnostic device can be integrated into a control unit which is arranged externally and spaced apart from the conveyor apparatus, for example, from a motorized roller, and which is connected in a wired manner to the conveyor apparatus and, for example, can also control two, three, four, or more conveyor device controllers. The diagnostic device can also be designed as a separate component used only for diagnosis and/or programming, which is connected to the conveyor apparatus only temporarily for the purpose of the diagnosis or programming.

The diagnostic device can comprise a communication interface which can, for example, be a graphical user interface which is configured to display the diagnostic data to a user. The graphical user interface can, for example, be configured to receive user inputs and to enable a manual control of the conveyor apparatus via analog signals from these user inputs. The communication interface can also be configured to transmit configuration data to a central control unit.

The diagnostic device can be developed in that the electronic diagnostic unit is configured to receive a user switchover command from a user interface and to output the analog switchover command to the control data interface upon receipt of the user switchover command.

The diagnostic device can be further developed in that the electronic diagnostic unit is configured to output the switchover command as a single analog control signal having a predetermined analog value, or as a predetermined sequence of analog control signals.

The diagnostic device can be further developed in that the control data interface comprises a first control data contact terminal, and the electronic diagnostic unit is configured to output the single analog control signal having a predetermined analog value or as a predetermined sequence of analog control signals, via the first control data contact terminal.

The diagnostic device can be further developed in that the control data interface comprises a first control data contact terminal and a second control data contact terminal, and the electronic diagnostic unit is configured to output the switchover command as a first predetermined analog control signal to the first control data contact terminal and as a second predetermined analog control signal to the second control data contact terminal, wherein the first and second predetermined analog control signals are output simultaneously, or the first and second predetermined analog control signals are output at a predetermined time interval.

The diagnostic device can be further developed in that, in the digital communication state, the control data interface comprises a first control data contact terminal and a second control data contact terminal, and the electronic diagnostic unit is configured to receive digital, binary-encoded diagnostic information data via the first control data contact terminal and to transmit digital, binary-encoded diagnostic query data via the second control data contact terminal.

The diagnostic device can be further developed, in that, in the operating state, the electronic diagnostic unit is configured to transmit analog control data to an analog drive control module of a conveyor apparatus which is connected to the control data interface, and to output the switchover command to the control data interface in the operating state, and after outputting the switchover command, to switch from the operating state to the digital communication state, in which the electronic diagnostic unit is configured to receive the diagnostic data record via the control data interface.

The diagnostic device can be further developed in that the diagnostic interface is a graphical user interface which is configured to display the diagnostic data to a user.

With respect to the diagnostic device and its developments, it is to be understood that they are in particular designed to be used as transceivers, corresponding to the previously described conveyor apparatus acting as a transceiver, and reference is correspondingly made to the advantages and variants described for the conveyor apparatus.

The present invention is further developed by a conveyance system comprising a diagnostic device having the previously described design, and a conveyor apparatus having the previously described design, wherein the control interface is connected to the connection interface for analog data transmission in the operating state, and for digital, binary-encoded configuration data in the digital communication state.

The digital, binary-encoded configuration data can comprise an encoded piece of information about an invariable characteristic of the conveyor apparatus, such as a gearbox ratio, a gearbox type, a serial number, a motor design, and/or a variable characteristic of the conveyor apparatus, such as a number of operating hours, a number of start-up operations, a maximum operating temperature, number of rotations of a drive unit, and/or query data.

A further aspect of the present invention provides a retrofitting unit for a conveyor apparatus, comprising an electronic drive control module having a connection interface which is configured for transmitting and/or receiving configuration data via the connection interface, wherein the drive control module is configured to receive analog control signals via the connection interface in an operating state and to control the drive unit as a function of these control signals, to output digital diagnostic signals via the connection interface in a digital communication state, and to switch from the operating state to the digital communication state upon receipt of a switchover command, wherein the switchover command is made up of a predetermined analog control signal or a predetermined sequence of analog control signals.

A further aspect of the present invention relates to a use of a retrofitting unit for a conveyor apparatus.

A further aspect of the present invention provides a method for outputting configuration data from an analog-controlled conveyor apparatus, comprising the steps of:
  receiving a switchover command as a predetermined analog control signal or a predetermined sequence of analog control signals in a drive control module;
  in response to the receipt of the switchover command, switching the drive control module from an operating state in which the drive control module is connected for receiving analog control signals and for controlling a drive unit as a function of the analog control signals, to a digital communication state in which the drive control module is connected for transmitting and receiving configuration data;
  encoding permanent or non-permanent characteristic information about the conveyor apparatus in the drive control module in a sequence of digital, binary-encoded configuration data; and
  transmitting the sequence of digital, binary-encoded configuration data via a connection interface of the drive control module.

A further aspect of the present invention provides a method for reading out configuration data of an analog-controlled conveyor apparatus, comprising the steps of:

transmitting a switchover command from an electronic diagnostic unit as a predetermined analog control signal or a predetermined sequence of analog control signals;

switching the electronic diagnostic unit from an operating state in which the electronic diagnostic unit is connected for transmitting analog control signals, to a digital communication state in which the electronic diagnostic unit is connected for transmitting and receiving configuration data;

receiving a sequence of digital, binary-encoded configuration data;

decoding the sequence of digital, binary-encoded configuration data into diagnostic information; and outputting the diagnostic information via a communication interface.

The diagnostic data can, for example, be displayed to the operating personnel and/or transmitted to an electronic receiving unit.

With respect to the advantages, embodiment variants, and embodiment details of these further aspects of the present invention and its respective developments, reference is made to the preceding description with respect to the corresponding features of the conveyor apparatus and the diagnostic device.

Embodiments of the present invention are explained below by way of example with the aid of the attached drawings.

In the drawings, identical or essentially functionally identical or similar elements are designated by the same reference characters.

Figure 1:
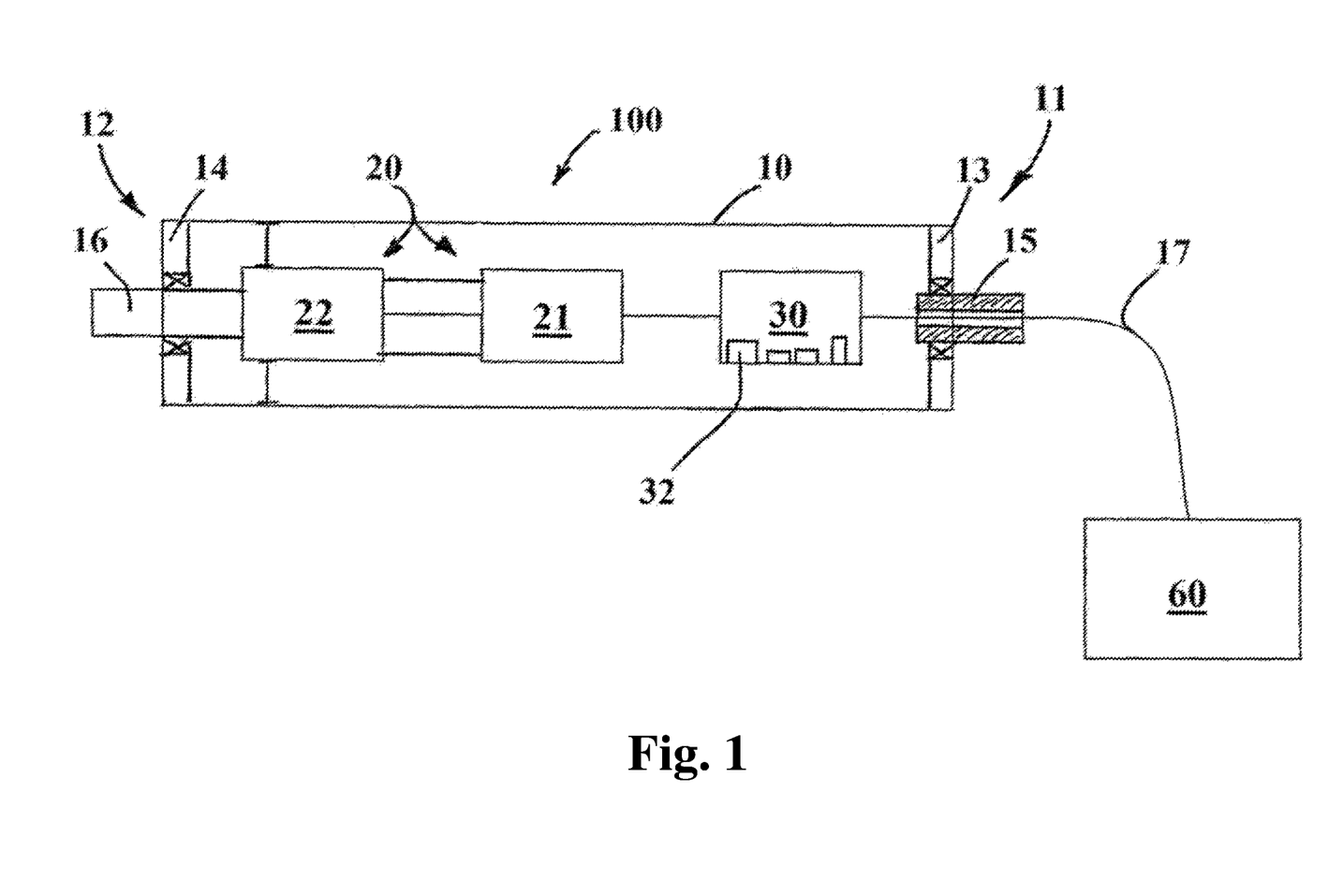
FIG. 1 depicts a longitudinal sectional view of a basic drawing of a motor-operated conveyor roller according to the present invention.

FIG. 1 depicts a basic drawing of a motor-operated conveyor roller 100 comprising a conveyor apparatus according to the present invention. The motor-operated conveyor roller 100 comprises a conveyor roller tube 10 having a first end 11 and a second end 12 which is opposite the first end 11. An end cap 13 is inserted into the first end 11 and rotatably encloses a first axle element 15 which projects laterally from the first end 11 of the conveyor roller tube 10, via a bearing unit. Similarly thereto, an end cap 14 is installed on the second end 12 and encloses a second axle element 16 via a bearing unit. The first axle element 15 and the second axle element 16 are arranged coaxially with respect to one other and define a rotational axis about which the conveyor roller tube 10 can rotate if it is mounted in a corresponding framework.

A drive unit 20 comprising a motor 21 and a gearbox 22 is further arranged inside the conveyor roller tube 10. The motor 21 is connected via signal technology to an electronic control unit 30 which is arranged inside the conveyor roller tube 10. The electronic control unit 30 can, for example, comprise motor electronics which are used for actuating or commutating the motor 21. The electronic control unit 30 is connected via signal technology via a data line 17 to a control device 60 which is arranged outside of the conveyor roller tube 10. Via the data line 17, analog signals for controlling the motor 21 are transmitted from the control device 60 to the electronic control unit 30, for example, a 0 to 4 V signal, as a function of which the motor electronics of the electronic control unit 30 control the rotational speed of the motor 21. The gearbox 22 can be embodied in different designs and can in particular be omitted in order to achieve a direct drive of the motor 21 on the roller body. The motor 21 can, for example, be an electric motor.

The electronic control unit 30 furthermore comprises an electronic memory unit 32 in which the configuration data can be stored. The electronic memory unit 32 comprises in particular configuration data which are stored in the electronic memory unit 32 in a non-volatile manner and, for example, comprise a design of the motor-operated conveyor roller 100, the motor 21, the (planetary) gearbox 22, and/or the like.

The first axle element 15 has a drilled hole 15a which runs coaxially with respect to the axis of rotation. The data line 17 can thereby be routed from the outside into the conveyor roller tube 10.

Figure 2:
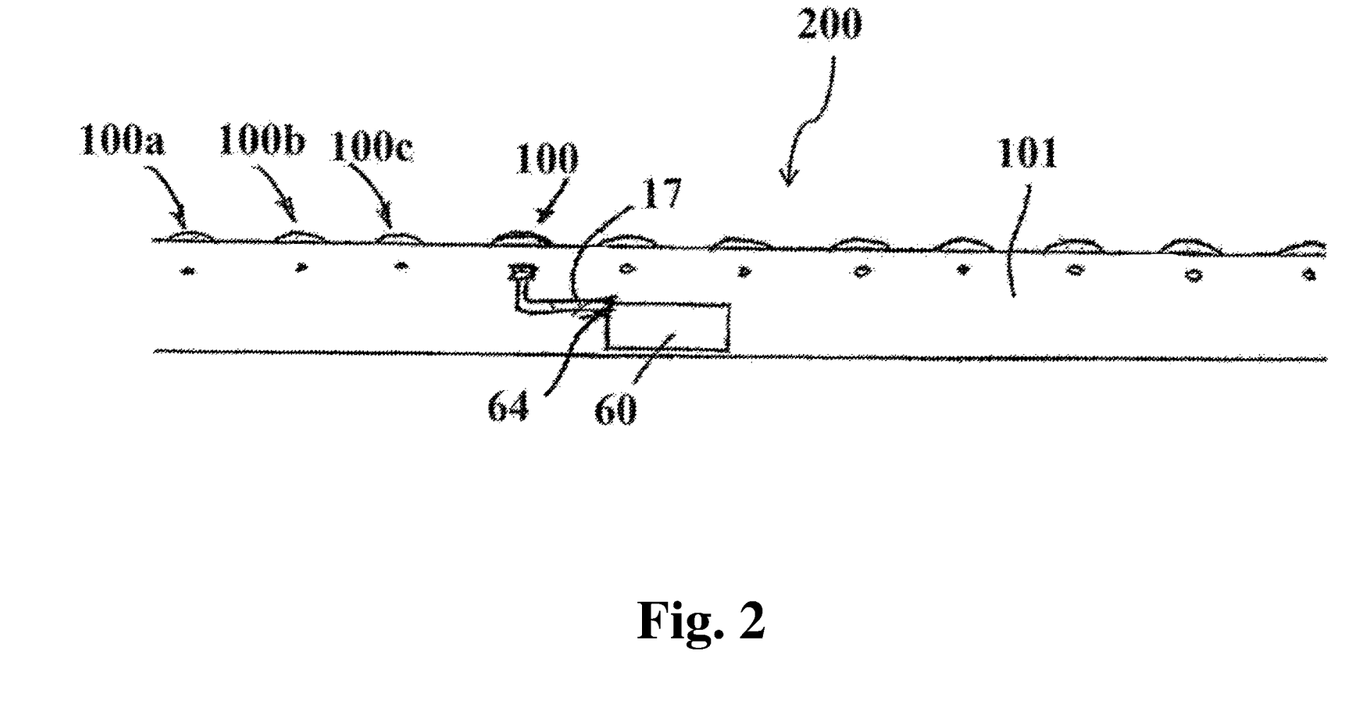
FIG. 2 depicts a basic arrangement of a conveyor apparatus comprising a motor-operated conveyor roller in a conveyor track.

FIG. 2 depicts a section of a conveyor track 200 comprising several conveyor rollers 100a, 100b, 100c which are arranged one behind the other, and a motor-operated conveyor roller 100. The motor-operated conveyor roller 100 is connected to a control device 60 via a data line 17. The control device 60 is arranged outside the conveyor roller tube 10 and is attached to a frame element of a framework 101 in which the motor-operated conveyor roller 100 is mounted. The control device 60 has a communication interface 64 to which the data line 17 is connected.

The data line 17 can generally be used to connect the motor-operated conveyor roller 100 to the control device 60, in order thereby to implement control signals, a power supply, or the like, which are necessary for controlling the motor-operated conveyor roller 100, from outside the motor-operated conveyor roller 100, and to supply them from the outside. The data line 17 can furthermore be used to connect the motor-operated conveyor roller 100 to a diagnostic device in the form of a so-called communication box. This communication box is then used to read out data from the motor-operated conveyor roller 100. It is to be understood that the communication box can also be integrated into the control device 60, which can then carry out both control tasks and diagnostic tasks in an integrated manner. It is likewise possible that a communication box which is equipped for diagnostic purposes is connected to the control device 60 as a separate unit in order to read out data correspondingly. Such a communication box which is equipped for diagnostic purposes can furthermore be connected to the motor-operated conveyor roller 100, instead of to the control device 60, as a separate unit via the data line 17.

Motor electronics which are integrated into the electronic control unit 30 are allocated to the drive unit 20 and are connected to the motor 21 via signal technology. Via the interaction of rotary encoders on the motor 21 and the electronic control unit 30, windings of the motor 21 can be correspondingly supplied with voltage from the motor electronics in order to generate a desired rotational speed and a desired torque. Electronic commutation can thus be achieved inside the motor-operated conveyor roller 100. In the operating mode of the motor-operated conveyor roller 100, the motor electronics receive analog control data via the data line 17.

Figure 3:
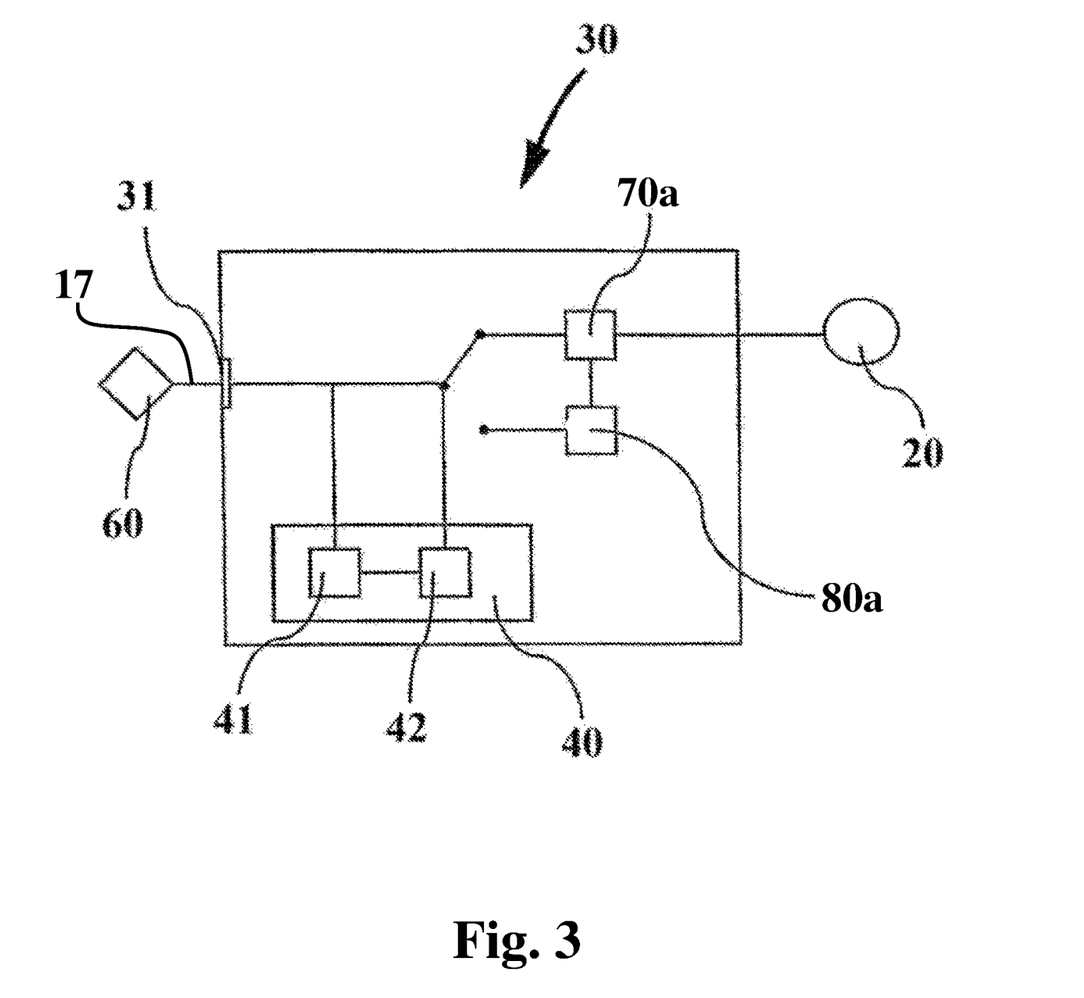
FIG. 3 depicts a schematic representation of a drive control module of a conveyor apparatus, according to the present invention.

With reference to FIG. 3, the electronic control unit 30 comprises a connection interface 31 which is configured for exchanging data, via the data line 17, with the control device 60 or a communication box 90 or a communication box 90 which is connected via a control device 60. Such data can be analog control data for controlling the rotational speed and the rotational direction of the motor 21. Such data can furthermore be configuration data which contain information about characteristics of the motor-operated conveyor roller 100. Mechanical operating data, thermal operating data, and/or temporal operating data can thus, for example, be transmitted as configuration data, which thus describe temporally variable states which occur during operation. Configuration data can also be invariable information about the motor-operated conveyor roller 100 which, for example, describe a design of the gearbox 22 or the motor 21, a piece of information about the reduction ratio of the gearbox 22, a serial number of the motor-operated conveyor roller 100, or the like.

The electronic control unit 30 has a switchover device 40. This switchover device 40 is configured to detect a switchover command received via the data line 17, and to effectuate a switchover between two different states of the electronic control unit 30 of the motor-operated conveyor roller 100. In a first state, the operating state, the electronic control unit 30 is configured to receive analog control signals via the data line 17, and the motor electronics process these analog control signal in order thereby to actuate the motor 21 for a particular rotational speed. In a second state, the diagnostic state, the electronic control unit 30 is configured to transmit or receive configuration data, as previously described. The switchover device 40 comprises a detector module 41 for the purpose of switching between the operating state and the diagnostic state. The detector module 41 is configured to detect an analog control signal and/or a particular sequence of analog control signals as a switchover command. A particular analog value of the control signal which is not used as a control signal in the normal operating state can thus, for example, be used to transmit a switchover command. The analog rotational speed control could, for example, operate as a control signal in a range from −4 to +4 volts, and an analog signal value of +5 volts could effectuate a switchover command from the operating state to the diagnostic state. A brief sequence of analog rotational direction reversal signals, for example, forward-reverse-forward-reverse-forward-reverse-forward-reverse (=+2 V, −2 V, +2 V, −2 V, +2 V, −2 V, +2 V, −2 V), which is received within seconds, could likewise be interpreted by the detector module 41 as a switchover command.

Upon receipt of a switchover command, the detector module 41 actuates a switching module 42, which switches from the analog operating state to the digital diagnostic state.

In the digital diagnostic state, the electronic control unit 30 is configured to transmit digital data signals via the data line 17. In the diagnostic state, sending data which contain operating data or configuration data can generally take place by analog signals via the data line 17, for example, in that the communication box is configured to interpret such analog signals correspondingly, and to take the reading of particular operating states or configuration states therefrom, with the aid of pre-stored, predetermined comparison values.

It is basically to be understood that the connection interface 31 of the electronic control unit 30 can be connected to a control device 60 which is provided externally, as is shown in FIG. 3. The control device 60 can comprise a communication box in order thereby to carry out the readout operations in the digital diagnostic state. A communication box can also be connected to the control device 60 in order to carry out the configuration and readout operations in the diagnostic state, via the control device 60.

Figure 4:
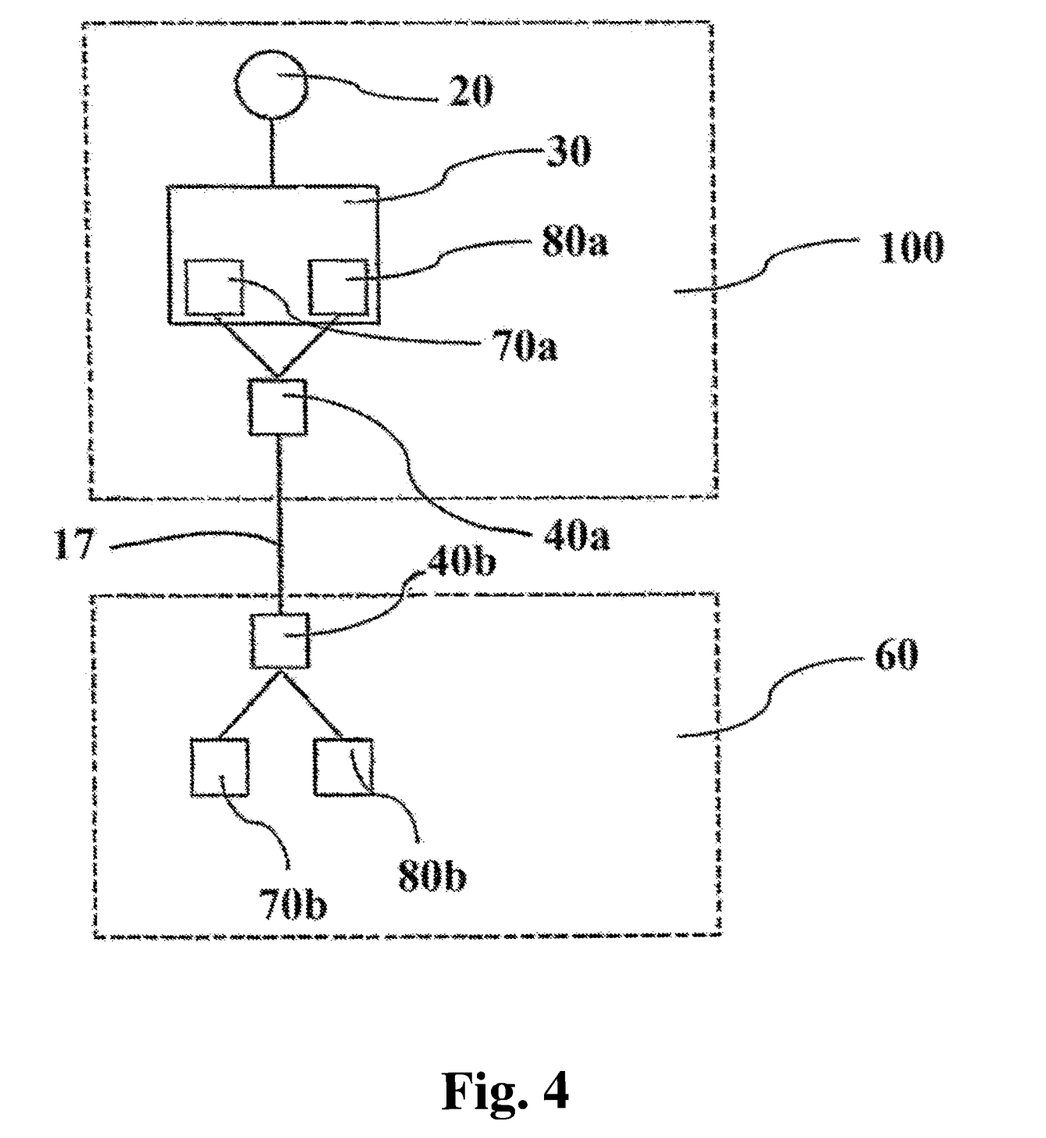
FIG. 4 depicts a schematic representation of a conveyor apparatus according to the present invention for exchanging communication data, in a first embodiment.

FIG. 4 depicts a schematic representation of a motor-operated conveyor roller 100 according to the present invention, which is connected to a control device 60 having an integrated communication box for exchanging configuration data. The motor-operated conveyor roller 100 comprises the drive unit 20, which is connected to the electronic control unit 30 via signal technology. The electronic control unit 30 is connected to the control device 60 via a data line 17. On the side of the motor-operated conveyor roller 100, a switchover device 40a for switching between the operating state and the diagnostic state is an integral component of the electronic control unit 30 on the end of the data line 17 there. On the side of the control device having a control device 60, a signal changeover switch 40b is provided on the end of the data line 17 there for switching between the analog operating state and the digital diagnostic state. The electronic control unit 30 is connected to the control device via the data line, via the switchover device 40a and the signal changeover switch 40b.

In the operating state configuration, via the data line 17, the motor electronics in the electronic control unit 30 can receive commands in analog form from an analog terminal 70b of the control device 60 at an analog terminal 70a, and can send error signals in analog form from the analog terminal 70a to the analog terminal 70b, to the communication box in the control device 60.

In the diagnostic state, the electronic control unit 30 can transmit diagnostic and operating data and configuration data from the digital terminal 80a to the digital terminal 80b of the control device 60.

Figure 5:
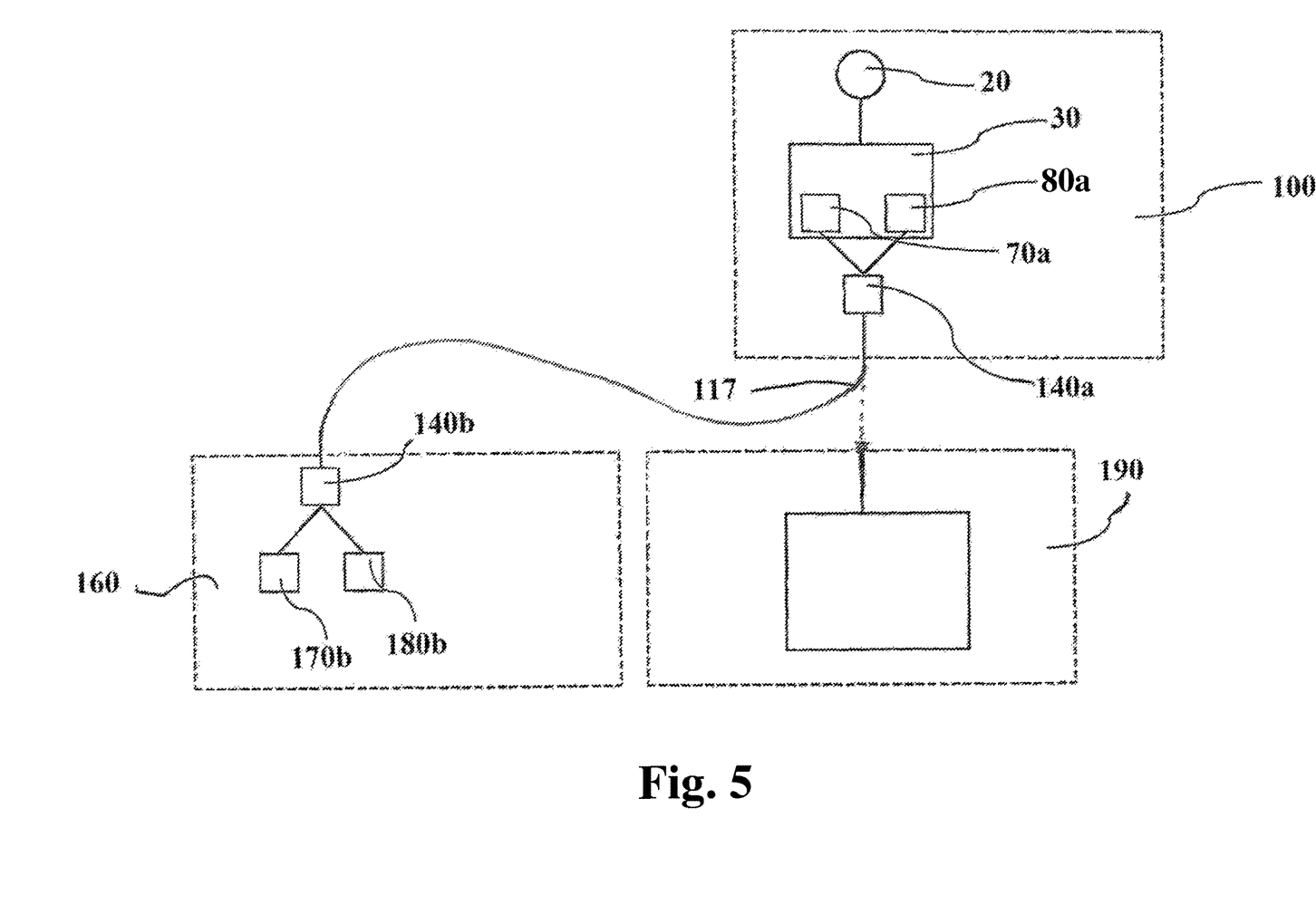
FIG. 5 depicts a schematic representation of a conveyor apparatus according to the present invention for exchanging communication data, in a second embodiment.

FIG. 5 depicts a communication box 160 which is connected to the motor-operated conveyor roller 100 instead of a control unit. In this embodiment, the motor-operated conveyor roller 100 is connected to a control unit 190 in the operating mode, but can instead be connected to a communication box 160 in order to read out configuration data from the motor-operated conveyor roller 100. The communication box 160 comprises an analog terminal 170b, a digital terminal 180b, and a signal changeover switch 140b. In this application case, the analog terminal 170b and the signal changeover switch 140b are only used to transmit an analog switchover signal and to switch subsequently to digital communication for receiving the configuration data digitally, and after the data are received, to switch back to the analog mode.

Figure 6:
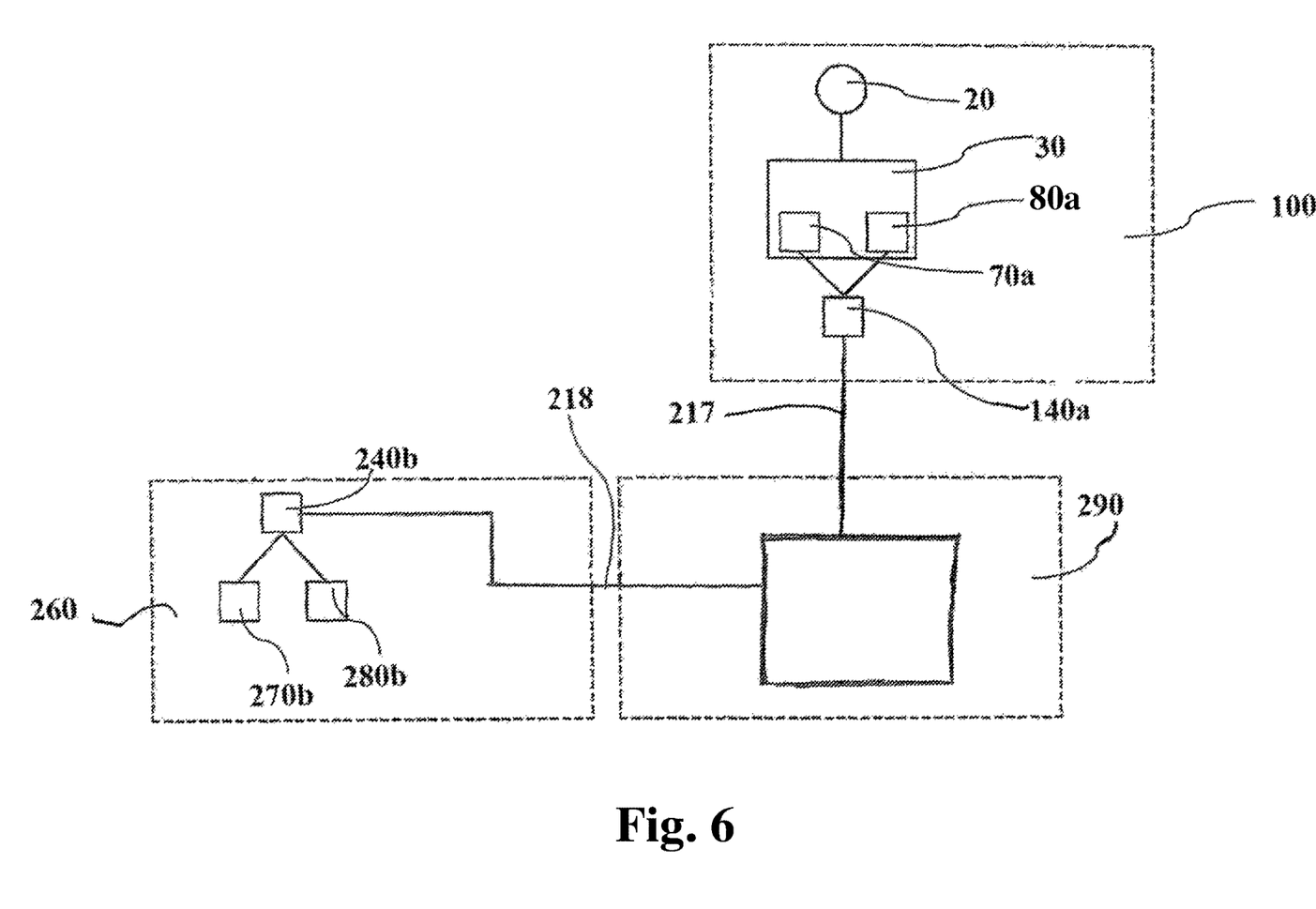
FIG. 6 depicts a schematic representation of a conveyor apparatus according to the present invention for exchanging communication data, in a third embodiment.

FIG. 6 depicts a communication box 160 which is connected to the motorized roller via an electronic control unit. In this embodiment, the motor-operated conveyor roller 100 is permanently connected to a control unit 290, as in the first exemplary embodiment according to FIG. 4. A communication box 260 can be connected to this control unit 290 via a query connection 218 in order to read out configuration data from the motor-operated conveyor roller 100. The communication box 260 comprises an analog terminal 270b, a digital terminal 280b, and a signal changeover switch 240b. In this application case, the analog terminal 270b and the signal changeover switch 240b are used only to transmit an analog switchover signal and to switch subsequently to digital communication for receiving the configuration data digitally, and after the data are received, to switch back to the analog mode.

The present invention is not limited to embodiments described herein; reference should be had to the appended claims.

LIST OF REFERENCE NUMERALS

1 Conveyor apparatus
10 Conveyor roller tube
11 First end
12 Second end
13 End cap
14 End cap
15 First axle element
15a Drilled hole 16 Second axle element
17 Data line
20 Drive unit
21 Motor
22 Gearbox
30 Electronic control unit
31 Connection interface
32 Electronic memory unit
40 Switchover device
40a Switchover device (A/D of the electronic control unit)
40b Signal changeover switch (A/D of the control device)
41 Detector module
42 Switching module
60 Control device
64 Communication interface
70a Analog terminal (of electronic control unit)
70b Analog terminal (of control device)
80a Digital terminal (of electronic control unit)
80b Digital terminal (of control device)
100 Motor-operated conveyor roller
100a Conveyor roller
100b Conveyor roller
100c Conveyor roller
101 Framework
117 Data line
140a Switchover device
140b Signal changeover switch
160 Communication box
170b Analog terminal (of communication box)
180b Digital terminal (of communication box)
190 Control unit
200 Conveyor track
217 Data line
218 Query connection
240b Signal changeover switch
260 Communication box
270b Analog terminal (of communication box)
280b Digital terminal (of communication box)
290 Control unit

What is claimed is:

1. A conveyor apparatus comprising:
a drive unit;
a connection interface which is configured for analog signal transmission; and
a drive control module which is coupled to the drive unit and to the connection interface via signal technology, the drive control module being configured:
to receive analog control signals via the connection interface in an operating state and to control the drive unit as a function of the analog control signals,
to output digital diagnostic signals via the connection interface in a digital communication state, and
to switch from the operating state to the digital communication state upon receipt of a switchover command, the switchover command being made up of a predetermined analog control signal or a predetermined sequence of analog control signals.

2. The conveyor apparatus as recited in claim 1, wherein the drive control module is further configured to switch from the digital communication state to the operating state upon receipt of a switchback command which is formed by a predetermined digital data signal.

3. The conveyor apparatus as recited in claim 1, wherein, the predetermined analog control signal is a single analog control signal having a predetermined analog value, and the predetermined sequence of analog control signals have predetermined matching analog values or have predetermined analog values which are different from one another.

4. The conveyor apparatus as recited in claim 1, wherein, the connection interface comprises a first control data contact terminal, and
the drive control module is further configured to transmit at least one of a single analog control signal and a sequence of analog control signals via the first control data contact terminal.

5. The conveyor apparatus as recited in claim 4, wherein the sequence of analog control signals comprises at least one temporal sequence of a first voltage signal, a second voltage signal, and a third voltage signal.

6. The conveyor apparatus as recited in claim 4, wherein the drive control module is further configured to at least one of receive and transmit a sequence of configuration data in the digital communication state via the first control data contact terminal.

7. The conveyor apparatus as recited in claim 1, wherein,
the connection interface comprises a first control data contact terminal and a second control data contact terminal, and
the predetermined sequence of analog control signals are provided as a first predetermined analog control signal and as a second predetermined analog control signal as the switchover command, and
the drive control module is further configured to receive the first predetermined analog control signal at the first control data contact terminal and the second predetermined analog control signal at the second control data contact terminal.

8. The conveyor apparatus as recited in claim 7, wherein the drive control module is further configured,
to receive the first predetermined analog control signal and the second predetermined analog control signal synchronously,
to receive the first predetermined analog control signal and the second predetermined analog control signal with a time shift,
to receive the first predetermined analog control signal and the second predetermined analog control signal as a single analog control signal, respectively, or
to receive the first predetermined analog control signal and the second predetermined analog control signal as a temporal sequence of analog control signals, respectively.

9. The conveyor apparatus as recited in claim 7, wherein the drive control module is further configured, in the digital communication state, to at least one of,
receive a sequence of configuration data via the first control data contact terminal, and
to transmit the sequence of configuration data via the second control data contact terminal.

10. A diagnostic device for a conveyor apparatus comprising a motor-operated conveyor roller, the diagnostic device comprising:
an electronic diagnostic unit comprising a control data interface, the electronic diagnostic unit being configured to output an analog switchover command to the control data interface,
wherein,
the analog switchover command is outputted by the electronic diagnostic unit via the control data interface as a predetermined analog control signal or as a predetermined sequence of analog control signals, after outputting the analog switchover command, a diagnostic data record is received via the control data interface in a digital communication state, and the diagnostic data record is received as a sequence of digital, binary-encoded diagnostic data.

11. The diagnostic device as recited in claim 10, wherein the electronic diagnostic unit is further configured to receive a user switchover command from a user interface and to output the analog switchover command to the control data interface upon receipt of the user switchover command.

12. The diagnostic device as recited in claim 10, wherein, the predetermined analog control signal is outputted by the electronic diagnostic unit as a single analog control signal having a predetermined analog value, and the predetermined sequence of analog control signals are outputted by the electronic diagnostic unit as predetermined matching analog values or as predetermined analog values which are different from one another.

13. The diagnostic device as recited in claim 12, wherein, the control data interface comprises a first control data contact terminal, and the electronic diagnostic unit is further configured to output the single analog control signal having a predetermined analog value or the predetermined sequence of analog control signals via the first control data contact terminal.

14. The diagnostic device as recited in claim 10, wherein, the control data interface comprises a first control data contact terminal and a second control data contact terminal, the predetermined sequence of analog control signals is outputted by the electronic diagnostic unit as the analog switchover command as a first predetermined analog control signal to the first control data contact terminal and as a second predetermined analog control signal to the second control data contact terminal, and the first predetermined analog control signal and the second predetermined analog control signal are output simultaneously, or the first predetermined analog control signal and the second predetermined analog control signal are output at a predetermined time interval.

15. The diagnostic device as recited in claim 10, wherein, in the digital communication state, the control data interface comprises a first control data contact terminal and a second control data contact terminal, and the electronic diagnostic unit is further configured to receive digital, binary-encoded diagnostic information data via the first control data contact terminal and to transmit digital, binary-encoded diagnostic query data via the second control data contact terminal.

16. The diagnostic device as recited in claim 10, further comprising:

a conveyor apparatus which is connected to the control data interface, the conveyor apparatus comprising an analog drive control module, wherein, in an operating state, the electronic diagnostic unit is further configured, to transmit analog control data to the analog drive control module, to output the analog switchover command to the control data interface in the operating state, and after outputting the analog switchover command, to switch from the operating state to the digital communication state, in which the electronic diagnostic unit is further configured to receive the diagnostic data record via the control data interface.

17. The diagnostic device as recited in claim 10, wherein the control data interface is a graphical user interface which is configured to display the diagnostic data to a user.

18. A conveyance system comprising:

a diagnostic device for a conveyor apparatus comprising a motor-operated conveyor roller, the diagnostic device comprising, an electronic diagnostic unit comprising a control data interface, the electronic diagnostic unit being configured to output an analog switchover command to the control data interface, wherein, the analog switchover command is outputted via the control data interface as a predetermined analog control signal or as a predetermined sequence of analog control signals, after outputting the analog switchover command, a diagnostic data record is received via the control data interface in a digital communication state, and the diagnostic data record is received as a sequence of digital, binary-encoded diagnostic data; and a conveyor apparatus comprising, a drive unit, a connection interface which is configured for analog signal transmission, and a drive control module which is coupled to the drive unit and to the connection interface via signal technology, the drive control module being configured, to receive analog control signals via the connection interface in an operating state and to control the drive unit as a function of the analog control signals, to output digital diagnostic signals via the connection interface in a digital communication state, and to switch from the operating state to the digital communication state upon receipt of a switchover command, the switchover command being made up of a predetermined analog control signal or a predetermined sequence of analog control signals, wherein, the control data interface is connected to the connection interface, for an analog data transmission in the operating state, and for a digital, binary-encoded configuration data in the digital communication state.

19. A method for outputting configuration data from an analog-controlled conveyor apparatus, the method comprising:

receiving a switchover command as a predetermined analog control signal or as a predetermined sequence of analog control signals in a drive control module;

switching, in response to the receipt of the switchover command, the drive control module from an operating state in which the drive control module is connected for receiving analog control signals and for controlling a drive unit as a function of the analog control signals, to a digital communication state in which the drive control module is connected for transmitting and receiving configuration data;

encoding permanent characteristic information or non-permanent characteristic information about the analog-controlled conveyor apparatus in the drive control module in a sequence of digital, binary-encoded configuration data; and transmitting the sequence of digital, binary-encoded configuration data via a connection interface of the drive control module.

20. A method for reading out configuration data of an analog-controlled conveyor apparatus, the method comprising:
- transmitting a switchover command from an electronic diagnostic unit as a predetermined analog control signal or as a predetermined sequence of analog control signals;
- switching the electronic diagnostic unit from an operating state in which the electronic diagnostic unit is connected for transmitting analog control signals, to a digital communication state in which the electronic diagnostic unit is connected for transmitting and receiving configuration data;
- receiving a sequence of digital, binary-encoded configuration data;
- decoding the sequence of digital, binary-encoded configuration data into diagnostic information; and
- outputting the diagnostic information via a communication interface.

\* \* \* \* \*